Figure 1:
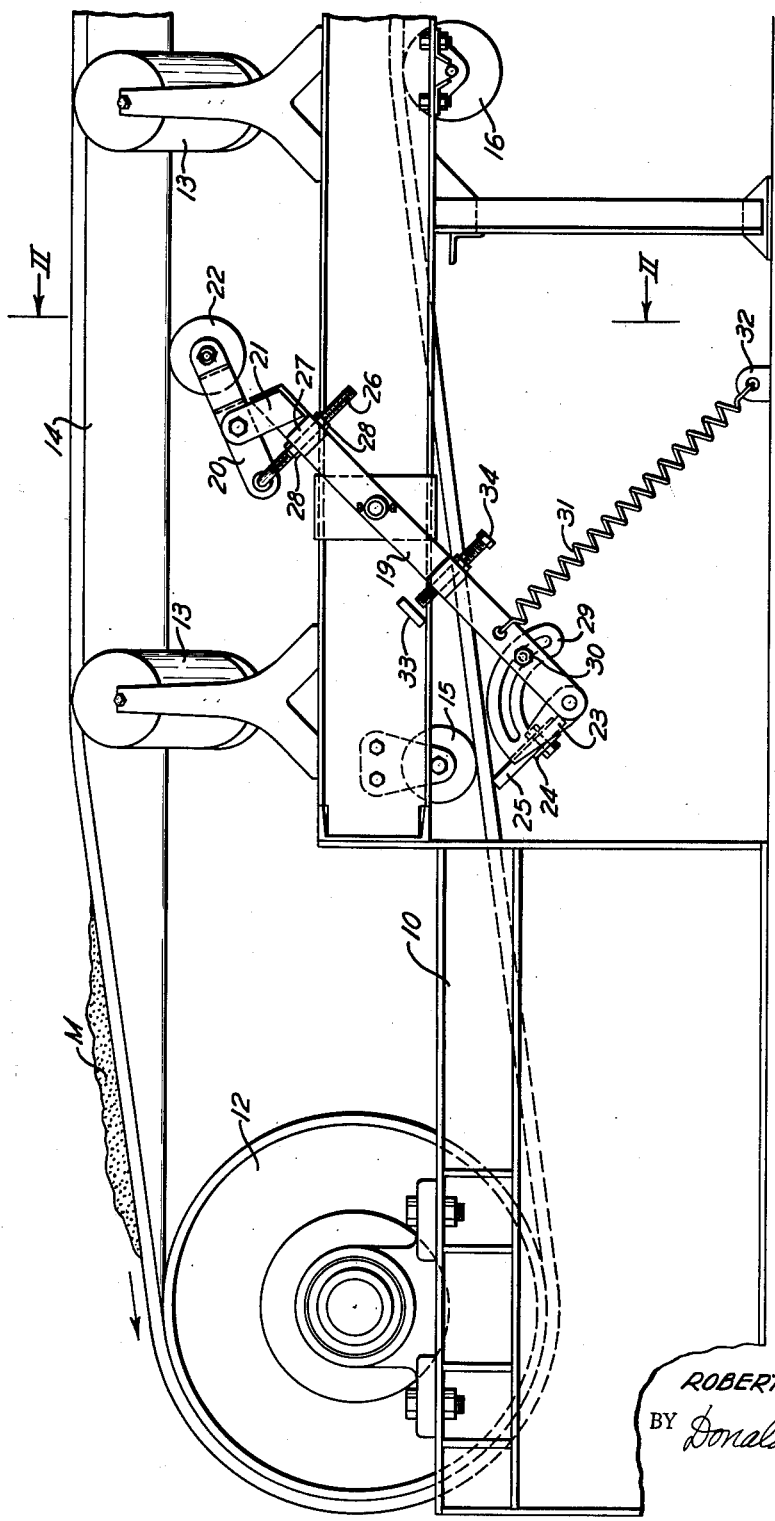

INVENTOR.
ROBERT H. MARTIN
BY Donald G. Dalton
ATTORNEY

Aug. 27, 1963  R. H. MARTIN  3,101,837
WIPER MECHANISM FOR CONVEYOR BELTS
Filed May 11, 1961  2 Sheets-Sheet 2
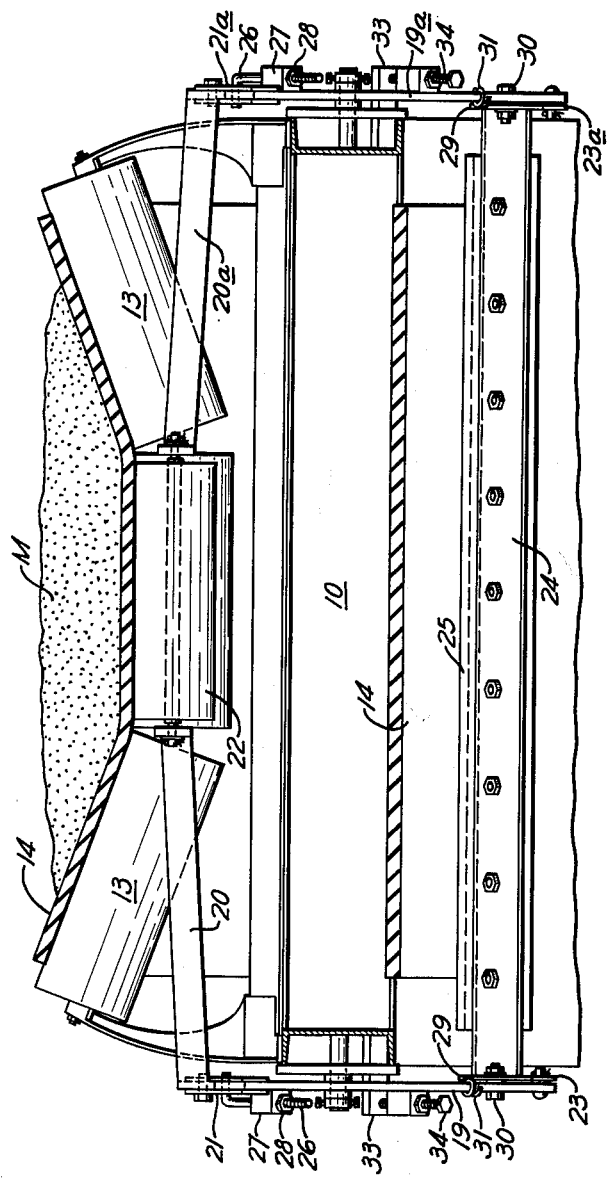
INVENTOR.
ROBERT H. MARTIN
BY Donald G. Dalton
ATTORNEY (United States Patent Office)

3,101,837
Patented Aug. 27, 1963

3,101,837
WIPER MECHANISM FOR CONVEYOR BELTS
Robert H. Martin, 302 9th St. S., Virginia, Minn.
Filed May 11, 1961, Ser. No. 109,288
6 Claims. (Cl. 198—230)

This invention relates to an improved wiper mechanism for a conveyor belt.

When a conveyor belt carries sticky material, such as wet ore, some material clings to the belt on its return flight. This material commonly is removed with a wiper which engages the belt surface on its return flight adjacent the discharge end of the belt. The usual wiper is fixed to the conveyor frame and does not exert uniform pressure against the belt surface. When the belt is empty, its return flight sags against the wiper and there is excessive wear. When the belt is fully loaded, its return flight is taut and may clear the wiper. Adjustments in the position of the wiper are difficult and usually can be made only when the belt is stopped.

An object of the present invention is to provide an improved wiper mechanism which adjusts itself automatically in accordance with the load on the belt and thus enables the wiper to exert substantially uniform pressure against the belt surface.

A further object is to provide an improved wiper mechanism which is readily adjustable manually without stopping the belt, for example to compensate for wear.

A more specific object is to provide an improved wiper mechanism which includes spring-biased levers pivoted to a belt frame, a roller journaled to the upper ends of the levers and riding against the underside of the belt on its carrying flight to position the levers in accordance with the load on the belt, and a wiper mounted on the lower ends of the levers and engaging the carrying surface of the belt on its return flight.

In accomplishing these and other objects of the invention, I have provided improved details of structure, a preferred form of which is shown in the accompanying drawings, in which:

FIGURE 1 is a side elevational view of a portion of a conveyor belt equipped with my wiper mechanism; and FIGURE 2 is a cross section on line II—II of FIGURE 1.

The drawing shows a portion of a conventional conveyor installation which includes a fixed frame 10, a head pulley 12 and troughing idler rollers 13 journaled to the frame, and a belt 14 running over said pulley and rollers. The belt is driven by any suitable mechanism not shown, and its upper or carrying flight carries bulk material M from right to left as viewed in FIGURE 1. The material discharges into a suitable receiver, not shown, beneath the head pulley 12. On its return flight the belt passes under an idler roller 15 and over another idler roller 16 journaled to the frame.

My wiper mechanism comprises a pair of levers 19 and 19a pivoted to opposite sides of frame 10 on a common horizontal axis intermediate the carrying and return flights of the belt, a pair of arms 20 and 20a adjustably pivoted to brackets 21 and 21a at the upper ends of the respective levers, a roller 22 journaled between the two arms 20 and 20a, arms 23 and 23a adjustably pivoted to the lower ends of the respective levers, a bar 24 extending between the two arms 23 and 23a, and a wiper 25 of rubber or the like fixed to bar 24. Roller 22 rides against the underside of belt 14 on its carrying flight, while wiper 25 engages the carrying surface of the belt on its return flight adjacent roller 15. The adjusting means for arm 20 includes a screw-threaded spindle 26 pivoted to this arm and loosely received in a sleeve 27 fixed to lever 19, and nuts 28 threadedly engaged with the spindle. The bore through sleeve 27 is sufficiently large to permit adjustment through the limited range needed. The adjusting means for arm 23 includes a slotted arcuate brace 29 fixed to this arm and a bolt 30 which passes through the slot and through a mating opening in lever 19. A tension spring 31 is connected to lever 19 below its pivotal axis and to a bracket 32 fixed to the floor beneath frame 10. The spring biases the lever counterclockwise about its pivot and thus urges roller 22 into engagement with belt 14. A stop 33 is fixed to frame 10, and a cooperating screw 34 is adjustably mounted on lever 19. The adjusting means, spring and stop can be duplicated on the other lever 19a, or they can be applied only to the more accessible side of the conveyor.

In operation, I first adjust arms 20, 20a, 23 and 23a so that wiper 25 engages belt 14 with sufficient pressure to remove clinging material, but not to cause excessive wear. As a load on the belt forces its carrying flight downwardly, it return flight becomes taut. The load also forces roller 22 downwardly and wiper 25 upwardly into continuous engagement with the belt surface. With proper adjustment the pressure of the wiper is substantially uniform. I adjust screw 34 so that it does not engage stop 33 as long as the load remains in the normal range. If the load becomes excessive, the screw engages the stop to prevent damage.

While I have shown and described only a single embodiment of my invention, it is apparent that modifications may arise. Therefore, I do not wish to be limited to the disclosure set forth but only by the scope of the appended claims.

I claim:

1. In a conveyor installation which includes a frame, a conveyor belt, and means movably mounting said belt on said frame, said belt having an upper carrying flight and a lower return flight, the combination therewith of a wiper mechanism comprising a lever pivoted to said frame intermediate said carrying flight and said return flight, a wiper supported by said lever and engaging said belt on its return flight, means supported by said lever and engaging said belt on its carrying flight and a bias operatively connected with said lever to maintain said last-named means in engagement with said belt, whereby the position of said lever is adjusted automatically with varying loads on the belt to maintain substantially uniform pressure of said wiper against said belt.

2. In a conveyor installation which includes a frame, a conveyor belt, and means movably mounting said belt on said frame, said belt having an upper carrying flight and a lower return flight, the combination therewith of a wiper mechanism comprising a lever pivoted to said frame intermediate said carrying flight and said return flight, a wiper supported by said lever and engaging said belt on its return flight, a roller supported by said lever and engaging said belt on its carrying flight, and spring means biasing said lever about its pivot in a direction to urge said roller into engagement with said belt, the position of said lever being adjusted automatically with varying loads on the belt to maintain substantially uniform pressure of said wiper against said belt.

3. In a conveyor installation which includes a frame, a conveyor belt, and means movably mounting said belt on said frame, said belt having an upper carrying flight and a lower return flight, the combination therewith of a wiper mechanism comprising a pair of levers pivoted on a common horizontal axis to opposite sides of said frame intermediate said carrying flight and said return flight, a wiper supported by said levers at their lower ends and engaging said belt on its return flight, a roller supported by said levers at their upper ends and engaging said belt on its carrying flight, and spring means biasing said levers about their pivotal axis in a direction to urge said roller into engagement with said belt, the positions of said levers being adjusted automatically with varying loads on the belt to maintain substantially uniform pressure of said wiper against said belt.

4. A combination as defined in claim 3 including arms pivoted to the respective levers at their upper ends, said roller being journaled to said arms, and means for adjusting said arms about their pivots to said levers and holding said arms in their adjusted positions.

5. A combination as defined in claim 3 including a bar pivoted to the lower ends of said levers and extending therebetween, said wiper being fixed to said bar, and means for holding said bar in adjusted position.

6. A combination as defined in claim 3 including a stop fixed to said frame, and adjustable means on one of said levers engageable with said stop to limit the position to which a load on said belt can force said levers.

References Cited in the file of this patent

FOREIGN PATENTS 1,037,363    Germany _____ Aug. 21, 1958